(12) United States Patent
Bayandin et al.

(10) Patent No.: US 11,562,298 B1
(45) Date of Patent: Jan. 24, 2023

(54) PREDICTIVE ANALYTICS USING FIRST-PARTY DATA OF LONG-TERM CONVERSION ENTITIES

(71) Applicant: Tomi.ai, Inc., New York, NY (US)

(72) Inventors: Konstantin Bayandin, Palo Alto, CA (US); Andrey Sapronov, Moscow (RU); Ayrat Fanisovich Mardanov, Moscow (RU)

(73) Assignee: Tomi.ai, Inc., New York, NY (US)

( * ) Notice: Subject to any disclaimer, the term of this patent is extended or adjusted under 35 U.S.C. 154(b) by 0 days.

(21) Appl. No.: 17/702,286

(22) Filed: Mar. 23, 2022

(51) Int. Cl.
*G06N 20/00* (2019.01)
*G06N 5/04* (2006.01)

(52) U.S. Cl.
CPC .............. *G06N 20/00* (2019.01); *G06N 5/04* (2013.01)

(58) Field of Classification Search
CPC .................................. G06N 20/00; G06N 5/04
See application file for complete search history.

(56) References Cited

U.S. PATENT DOCUMENTS

| | | | | |
|---|---|---|---|---|
| 9,947,028 | B1 * | 4/2018 | Podgorny | .......... G06Q 30/0269 |
| 10,963,808 | B1 * | 3/2021 | Kumari | .................. G06N 20/00 |
| 11,176,604 | B2 | 11/2021 | Feuerstein et al. | |
| 11,176,605 | B2 | 11/2021 | Feuerstein et al. | |
| 2010/0114654 | A1 * | 5/2010 | Lukose | .............. G06Q 30/0256 |
| | | | | 705/14.54 |
| 2015/0269609 | A1 * | 9/2015 | Mehanian | .......... G06Q 30/0246 |
| | | | | 705/14.45 |
| 2018/0150874 | A1 * | 5/2018 | Chen | .................. G06Q 30/0254 |
| 2020/0410514 | A1 * | 12/2020 | Livhits | ............... G06Q 30/0201 |
| 2021/0182868 | A1 * | 6/2021 | Zhang | .................... G06V 10/82 |
| 2022/0051282 | A1 * | 2/2022 | Morin | ................ G06Q 30/0202 |

* cited by examiner

*Primary Examiner* — Dave Misir
(74) *Attorney, Agent, or Firm* — ArentFox Schiff LLP; Michael Fainberg

(57) ABSTRACT

Disclosed herein are systems and method for generating synthetic events. A method may include: monitoring user activity on a website of a conversion entity; collecting, for a monitored user session, first-party data including clickstream information on the website; calculating, using a machine learning algorithm, a prediction score indicative of a likelihood that a user associated with the monitored user session will request an asset depicted on the website after a threshold period of time, wherein the machine learning algorithm is trained using training vectors that map at least website clickstream information from various user sessions to offline asset conversion information collected after the threshold period of time from the various user sessions; in response to determining that the prediction score is greater than a threshold prediction score, generating a synthetic event indicative of the request being made by the user; and transmitting the synthetic event to a content platform.

20 Claims, 5 Drawing Sheets

PREDICTIVE ANALYTICS USING FIRST-PARTY DATA OF LONG-TERM CONVERSION ENTITIES

FIELD OF TECHNOLOGY

The present disclosure relates to the field of data analytics, and, more specifically, to systems and methods for implementing predictive analytics using first-party data of conversion entities.

BACKGROUND

The growing shift of buyers and sellers to online platforms has led to a natural consequence of increased seller competition and rising marketing costs (increasing by over 20% annually). A rise in customer acquisition costs has also been propelled by strict privacy configurations set by Internet users. For example, third-party cookies, which were once essential for tracking an assessing audience quality, are commonly blocked due to said privacy configurations.

Analytics are useful for directing impressions, creating new marketing campaigns, and targeting specific users. However, because there is a lack of data (specifically third-party data), it is difficult to produce effective analytics. Companies are forced to rely on the limited amount of first-party data that they own and not all first-party data is created equal. For example, entities with long conversion cycles (e.g., long sales-cycles and lifetime value (LTV) driven businesses) largely have mid-funnel optimization data (e.g., leads, registrations, free trials) and offline conversions data (e.g., rare events available with a long delay) accessible to them. Mid-funnel information is not directly indicative of a conversion (i.e., generation of revenue by a paying customer) because in these entities, customer value is revealed over time. In addition to the lack of data, useful data is not received for a considerable amount of time. This makes the issue two fold—a lack of information and a delay in acquiring the information that is available.

Thus, in view of the lack of available useful data, there exists a need for predictive analytics that extrapolate from first-party data and have at least the same effectiveness as analytics for short-term conversion entities with a greater variety and amount of data—including third-party data. The need is even greater for long-term conversion entities that cannot estimate conversions immediately.

SUMMARY

Aspects of the disclosure relate to the field of data analytics. In some aspects, the techniques described herein relate to a method for generating synthetic events, the method including: monitoring user activity on a website of a conversion entity; collecting, for a monitored user session, first-party data including clickstream information on the website; calculating, using a machine learning algorithm, a prediction score indicative of a likelihood that a user associated with the monitored user session will request an asset depicted on the website after a threshold period of time, wherein the machine learning algorithm is trained using training vectors that map at least website clickstream information from various user sessions to offline asset conversion information collected after the threshold period of time from the various user sessions; in response to determining that the prediction score is greater than a threshold prediction score, generating a synthetic event indicative of the request being made by the user; and transmitting the synthetic event to a content platform.

In some aspects, the techniques described herein relate to a method, wherein the threshold period of time is one of: a week, a month, a year.

In some aspects, the techniques described herein relate to a method, further including: selecting, by the content platform, media content from a plurality of media content to present to the user, wherein the media content includes information about the asset; and transmitting, by the content platform, the media content to a device associated with the user.

In some aspects, the techniques described herein relate to a method, further including: calculating a plurality of prediction scores for users accessing the website; segmenting the plurality of prediction scores into different groups; and transmitting, to the content platform, the segmented plurality of prediction scores based on the different groups.

In some aspects, the techniques described herein relate to a method, further including: calculating a plurality of prediction scores for users accessing the website; ranking the plurality of prediction scores; and transmitting the ranked plurality of prediction scores to the content platform.

In some aspects, the techniques described herein relate to a method, further including: receiving contact information from the user; identifying the user as a lead in a client platform; and calculating the prediction score for the lead to convert into a subsequent request.

In some aspects, the techniques described herein relate to a method, wherein the offline asset conversion information includes a data-feed from customer relationship management (CRM) or end-to-end analytics system, and wherein the website clickstream information is aligned with the offline asset conversion information using unique identifiers including client identifiers, lead identifiers, email addresses, phone numbers, and first-party cookie identifiers.

In some aspects, the techniques described herein relate to a method, wherein the synthetic event further indicates a conversion size of the request for the asset.

In some aspects, the techniques described herein relate to a method, wherein the first-party data collected for the monitored user session and the training vectors further include at least one of: a page view count for at least one page of the website, a time spent per page of the website, a scroll depth indicative of an amount of a page viewed, geolocation, device and browser types, specific values associated with the asset on the website, online events related with progressions of an online purchase path.

In some aspects, the techniques described herein relate to a method, wherein the website clickstream information includes clicks on at least one HTML element on at least one page of the website.

In some aspects, the techniques described herein relate to a method, further including: in response to determining that the prediction score is greater than the threshold prediction score, updating an asset conversion forecast including anticipated revenue information.

In some aspects, the techniques described herein relate to a method, wherein the machine learning algorithm includes a plurality of machine learning models for at least one of: each hour in a day, a group of persons accessing the website, and target events indicated in the offline asset conversion information.

In some aspects, the techniques described herein relate to a method, wherein the target events include at least one of: a website revisit, a provision of contact details, a lead event, a sale event, and a conversion size, and wherein the machine learning models are configured to generate prediction scores for each target event.

In some aspects, the techniques described herein relate to a method, wherein the group of persons include at least one of: users that visit the website for a first time within a specified period of time, users that visit the website again within the specified period of time, and users that have not visited the website within the specified period of time but visited the website before the specified period of time.

In some aspects, the techniques described herein relate to a method, wherein the prediction score is an incremental prediction score, and wherein a final prediction score for each of the target events is calculated as a difference of respective prediction scores before and after a latest user session on the website by the user.

It should be noted that the methods described above may be implemented in a system comprising a hardware processor. Alternatively, the methods may be implemented using computer executable instructions of a non-transitory computer readable medium.

In some aspects, the techniques described herein relate to a system for generating synthetic events, the system including: a hardware processor configured to: monitor user activity on a website of a conversion entity; collect, for a monitored user session, first-party data including clickstream information on the website; calculate, using a machine learning algorithm, a prediction score indicative of a likelihood that a user associated with the monitored user session will request an asset depicted on the website after a threshold period of time, wherein the machine learning algorithm is trained using training vectors that map at least website clickstream information from various user sessions to offline asset conversion information collected after the threshold period of time from the various user sessions; in response to determining that the prediction score is greater than a threshold prediction score, generate a synthetic event indicative of the request being made by the user; and transmit the synthetic event to a content platform.

In some aspects, the techniques described herein relate to a non-transitory computer readable medium storing thereon computer executable instructions for generating synthetic events, including instructions for: monitoring user activity on a website of a conversion entity; collecting, for a monitored user session, first-party data including clickstream information on the website; calculating, using a machine learning algorithm, a prediction score indicative of a likelihood that a user associated with the monitored user session will request an asset depicted on the website after a threshold period of time, wherein the machine learning algorithm is trained using training vectors that map at least website clickstream information from various user sessions to offline asset conversion information collected after the threshold period of time from the various user sessions; in response to determining that the prediction score is greater than a threshold prediction score, generating a synthetic event indicative of the request being made by the user; and transmitting the synthetic event to a content platform.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Figure 1:
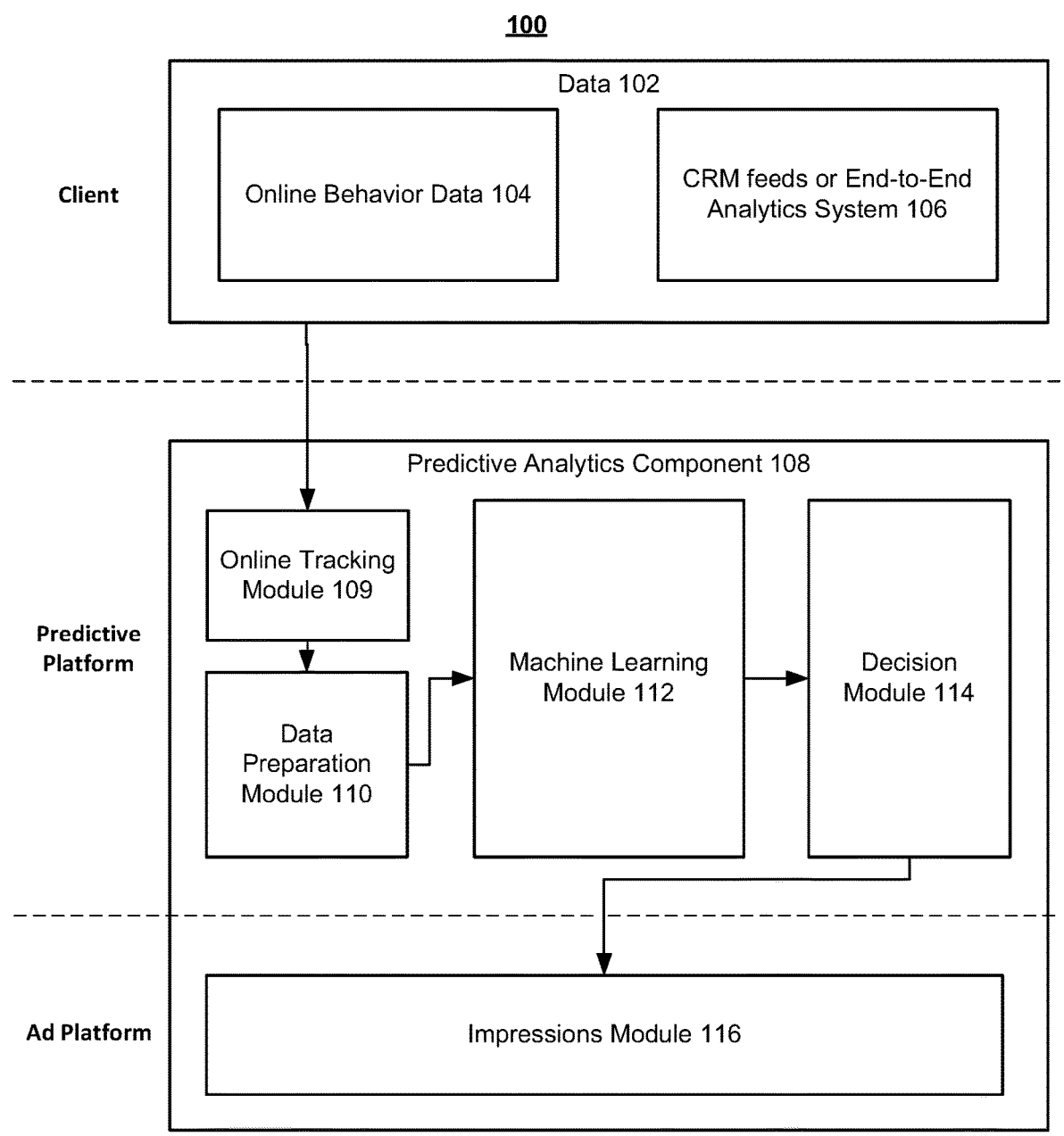
FIG. 1 is a block diagram illustrating a system for implementing predictive analytics using first-party data of long-term conversion entities.

Exemplary aspects are described herein in the context of a system, method, and computer program product for implementing predictive analytics using first-party data of long-term conversion entities and directing media content. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

The present disclosure implements predictive analytics using first-party data of long-term conversion entities, which include long sales-cycles and lifetime value (LTV) driven businesses (i.e., businesses where conversion from a collected online contact to a transaction can happen within 2-3 weeks or even more). Examples of these businesses include, but are not limited to, real estate, banking, insurance, the auto industry, and back-to-back SaaS. The benefits of said predictive analytics include increasing the frequency of conversions (by working with a probability distribution and sending synthetic conversions for a larger number of website visitors) without losing optimizations for value (average order size/LTV). The predictive analytics further deliver said conversions quickly (e.g., within hours from a visit to a website without waiting weeks or months for real conversions to happen). This enables the use of machine learning algorithms of content platforms (used interchangeably with ad platforms), which require minimal latency and are used to optimize e-commerce bids for directing marketing (e.g., impressions, ads, etc.). Another benefit of the predictive analytics is the enablement of training for platforms to create additional demand rather than cannibalizing organic and brand-search traffic. In this case, cannibalizing is referring to a conventional way of bidding and optimization of ads where too many ads may be shown to users who already have a high intent to buy on a particular website (e.g., repeat visitors). The conversion of these users is bound to happen (e.g., by coming directly to the website or through an unpaid online search engine). However, the paid ad impressions and clicks will get an unfair attribution of the final business outcome as if it happened because of their influence.

One of the core ideas behind the predictive analytics of the present disclosure is that in online marketing, there are no bad/inefficient audiences—there are wrong (e.g., inefficient) bids. The focus should be towards optimizing bids for revenue and LTV, instead of leads, registrations, free trials. Ideally, platforms should run marketing campaigns on autopilot when they get a good signal such as a high signal/noise ratio (e.g., conversions versus failed attempts) or a quick feedback loop (e.g., quick conversions).

The predictive analytics of the present disclosure operate on a premise that the purchase intent of a potential customer is largely revealed by his/her online (on-website/application) behavior. Thus, even if there is no third-party data available, information may be extrapolated from first-party online behavior data.

FIG. 1 is a block diagram illustrating system 100 for implementing predictive analytics using first-party data of long-term conversion entities. System 100 includes predictive analytics component 108, which may be a software application that runs on a computer system (described in FIG. 5). Predictive analytics component 108 may include multiple modules such as online tracking module 109, data preparation module 110, machine learning module 112, decisions module 114, and impressions module 116.

Predictive analytics component 108 receives data 102 from a client. Data 102 may include online behavior data 104 and data feeds from customer relationship management (CRM) or end-to-end analytics system 106. In an exemplary aspect, online tracking module 109 may be installed on a website of the long-term conversion entity (e.g., as a plugin) to enable the monitoring of user activity—particularly online behavior data 104. Online behavior data 104 includes a vast amount of information. Discerning customer intent from online behavior requires a capability to track data on a granular level, and at the same time, in a structured way. Otherwise, quantitative machine learning algorithms may be ineffective at producing meaningful predictions about future business outcomes an advertiser is likely to see in their CRM system.

In an exemplary aspect, online tracking module 109 collects online behavior data 104 (e.g., clicks on all or specific elements of the HTML page, number of all and specific page views, time spent of various pages, depth of page scrolling, geolocation, device and browser types, specific values associated with the product or service sold on a webpage, online events related with the progressions of the online purchase path, etc.). The known CRM feed 106 may be received by API-integration with the client's CRM. The CRM feed 106 comprises conversions (often online) that lead to revenue (e.g., which visitors became qualified leads, which scheduled a demo, and what was the amount of revenue generated per customer).

Data preparation module 110 is configured to match online behavior data 104 with CRM feeds 106. For example, if a user accesses the website of a long-term conversion entity, online tracking module 109 may collect, for a monitored user session, first-party data associated with the website access (e.g., clickstream data). The same user may eventually make a purchase of an asset depicted on the website after a threshold period of time (e.g., a week, a month, a year, etc.) from the user session. Because the purchase is not immediate, the transaction of the user is considered a long-term conversion. As hundreds of users may access the website over a period of time, matching the clickstream information collected to a transaction occurring, for example, a month later, is more challenging than short-term conversions (where a user accesses the website and makes an immediate purchase in the same user session). Data preparation module 110 uses various identifiers to align online behavior data 104 to CRM feeds 106 (this will be discussed in reference to FIG. 2).

Subsequent to alignment, machine learning module 112 trains at least one machine learning model to calculate predictive scores indicative of the probability of conversion and likely order size for any input online behavior data 104. Here, the training vectors of machine learning module 112 may map at least website clickstream information from various user sessions to offline asset conversion information (e.g., CRM feeds 106) collected after the threshold period of time from the various user sessions. For example, a simplistic training vector may be structured in the following manner (it should be noted that the first column is simply present for the sake of description that may or may not be part of the training vector). Table 1 shows a combination of online behavior data 104 and CRM feed 106 for successful conversions. In this case, the likelihood of the conversion is 100%. In other cases, however, a training vector may indicate that a conversion was not made (e.g., 0% likelihood of conversion).

TABLE 1

| Training Vector | |
| --- | --- |
| User Session ID | 123456ABC |
| User Session Date | 1/1/2022 |
| User Session Begin Time | 20:01 |
| User Session End Time | 21:51 |
| Time on Main Page | 20 seconds |
| Scroll Depth on Main Page | 80% |
| Clicks on Main Page Header - Item 1 | 2 |
| Clicks on Main Page Header - Item 2 | 0 |
| Clicks on Main Page Header - Item 3 | 1 |
| Time on Supplemental Page 1 | 100 seconds |
| Scroll Depth on Supplemental Page 1 | 100% |
| Time on Supplemental Page 2 | 0 seconds |
| Scroll Depth on Supplement Page 2 | 0% |
| Time on Supplemental Page 3 | 30 seconds |
| Scroll Depth on Supplemental Page 3 | 100% |
| Geolocation | 40.76164379855063, −73.98011522537008 |
| Browser | Google Chrome |
| Device Information | Microsoft Surface |
| Clickstream (item clicked (time between next click)) | 0 (20) - 1 (10) - 0 (100) - 1 (10) - 0 (30) - 3 (10) |
| Assets Viewed IDs | T000, T100, T200 |
| Customer ID | 123456ABC |
| Conversion Date | 2/1/2022 |
| Conversion Timestamp | 12:00 |
| Assets Purchased IDs | T000, T100 |
| Asset Amount | 2, 3 |
| Transaction Amount | $80 |

In some aspects, the first-party data collected for the monitored user session and the training vectors further comprise at least one of: a website page view count, a time spent per website page, a scroll depth indicative of an amount of a website page viewed. Thus, using machine learning module 112, predictive analytics component 108 may calculate a prediction score indicative of a likelihood that a user associated with an arbitrary monitored user session on the website will request an asset depicted on the website after a threshold period of time. In some aspects, predictive analytics component 108 may classify whether input online behavior data 104 will lead to a conversion and the prediction score is the confidence score associated with the classification. In essence, one can identify 10-20% of visitors who will be responsible for 80-90% of sales.

In some aspects, these prediction scores may then be integrated with impressions module 116, which executes advertising-directing algorithms using marketing APIs. For example, a marketer may want to choose how to build marketing campaigns (which audiences to target, and which optimization targets and bidding strategies to use). Accordingly, in an exemplary aspect, decisions module 114 may compare predictive scores to a threshold prediction score set by an operator of predictive analytics component 108. If a given prediction score is larger than the threshold, the score is sent as an optimization target to impressions module 116, which executes the advertising-directing algorithms through marketing APIs (server to server connection and conversion API), thus closing the feedback loop with advertising platforms.

The advertising-directing algorithms may be machine learning models such as "smart bidding" or "programmatic" models responsible for managing bids for different audiences (e.g., selecting media content from a plurality of media content to transmit to a user associated with a high prediction score). Unlike conventional data-driven attribution solutions, the system of the present disclosure does not allocate the known result (e.g., real LTV/order size) that is available with a significant delay (when the real sale happened) to a number of tracked client interactions. Thus the advertising-directing algorithms use the prediction scores instead of real conversions, and as a result, platforms learn how to get the exact traffic that corresponds to the portrait of the paying customer 10-30 times faster (compared to the traditional approach with rare conversions).

In the predictive attribution approach, predictive analytics component 108 scores the behavior of website users and therefore assigns value to a specific visit probabilistically with a forward-looking approach. A marketer may run A/B tests for ads/call to action (CTA)/creatives up to 100 times faster and cheaper by scoring all traffic for the purchase probability and likely order size as there is no need to wait for real conversions to happen. Each visit receives a value-score, allowing one to know which creative (if any) drives statistically significantly higher quality traffic way faster.

In addition to evaluating the media content, in some aspects, the results of predictive analytics component 108 may also enable marketers to evaluate, using the prediction scores, incremental (relatively small) changes to a website (e.g., whether changing placement of a search bar affects sales).

Impressions module 116 is thus an effective tool for marketers. Based on the output of the advertising-directing algorithm of impressions module 116, a marketer may buy ad impressions for just the top 1-20% of the recent high-intent visitors (or use them as a seed-audience for a look-alike campaign) with value-based retargeting audiences, or use predictive scores to run campaigns in other channels like emails and SMS for visitors who left contact details. For retargeting purposes, groups of segments are built that become progressively broader, but less inclined to buy. For example, a first group of customers may have the highest probability to buy. In smart retargeting, the group could form the most valuable segment over other customers in groups with a lesser probability to buy. Different target return on advertising spend (BOAS) and limits may be set for each group to increase overall effectiveness.

In some aspects, each prediction score is an incremental prediction score. A "final" prediction score for a target event (e.g., a sale, a lead, etc.) is calculated as a difference of respective prediction scores before and after a latest user session on the website by the user. By sending incremental values added for different touchpoints of a potential client along her/his buyer journey, platforms are prevented from the cannibalization of organic traffic and brand search. An alternative is to attribute all value brought by a visitor to the last channel, where the potential client saw an ad. In this case, the impact of organic and brand traffic is overrated. Traditional marketing attribution models give a lot of share for the final business outcome, but in practice users get to the website directly or search for a specific website after they see some online or offline ad. It is difficult for conventional marketing attribution models to track a direct link between the ad and the business outcome.

In an exemplary aspect, impressions module 116 may select media content, from a plurality of media content, to present to the user, wherein the media content comprises information about the asset. The media content may be part of a marketing campaign as a visual or audio-based commercial, a social media post, a website banner, etc.

Because a high prediction score already indicates that a user may request the asset (e.g., for purchase), media content is directed to the user to increase the likelihood. In contrast, sending impressions to random users is less effective, especially if the random user is not interested in the asset to begin with. Impressions module 116 may then transmit the media content to a device of the user. For example, a social media post that includes information about the asset may be generated on a smartphone of the user when the user is accessing a social media application. Furthermore, a marketer may want to determine which channels and platforms to use for marketing and how to allocate budgets between them. For example, the cost for a first media content in the plurality of media content may be greater than the cost for a second media content. To create a budget-appropriate distribution of media content, media content may be selected for transmission based on cost. For example, impressions module 116 may associate different costs with different levels of prediction scores. If a prediction score is greater than the threshold prediction score, the user is interested in the asset. If the prediction score is extremely high (e.g., because the user has spent a considerable amount on the website or frequently visits the website), a less expensive media content is needed. If the prediction score is somewhat high, a more expensive media content is needed for the user (to motivate or further inform the user to request the asset for purchase). Impressions module 116 may refer to a table that lists which media content to select based on the prediction score.

In some aspects, in response to determining that the prediction score is greater than the threshold prediction score, predictive analytics component 108 may also update an asset conversion forecast comprising anticipated revenue information. The prediction scores show incremental revenue forecast for every session (e.g., a website visit), without having to wait for a real sale to happen (in many sectors waiting could take weeks or months). Therefore, the expected revenue from each campaign/channel is known right away (e.g., with only a 2-hour delay) and reveals the amount of value each marketing campaign brings in.

In some aspects, impressions module 116 may select the media content from the plurality of media content based on the asset conversion forecast, wherein presenting a subset of the plurality of media content improves the asset conversion forecast. This reinforces the idea that media content should be directed to persons who are already interested in the asset depicted on the website.

For any given user sessions, predictive analytics component 108 may determine additional information about the user such that impressions module 116 can direct media content to the user. The additional information may include, for example, HTML tracking codes (cookies), email addresses, phone numbers, etc.

Figure 2:
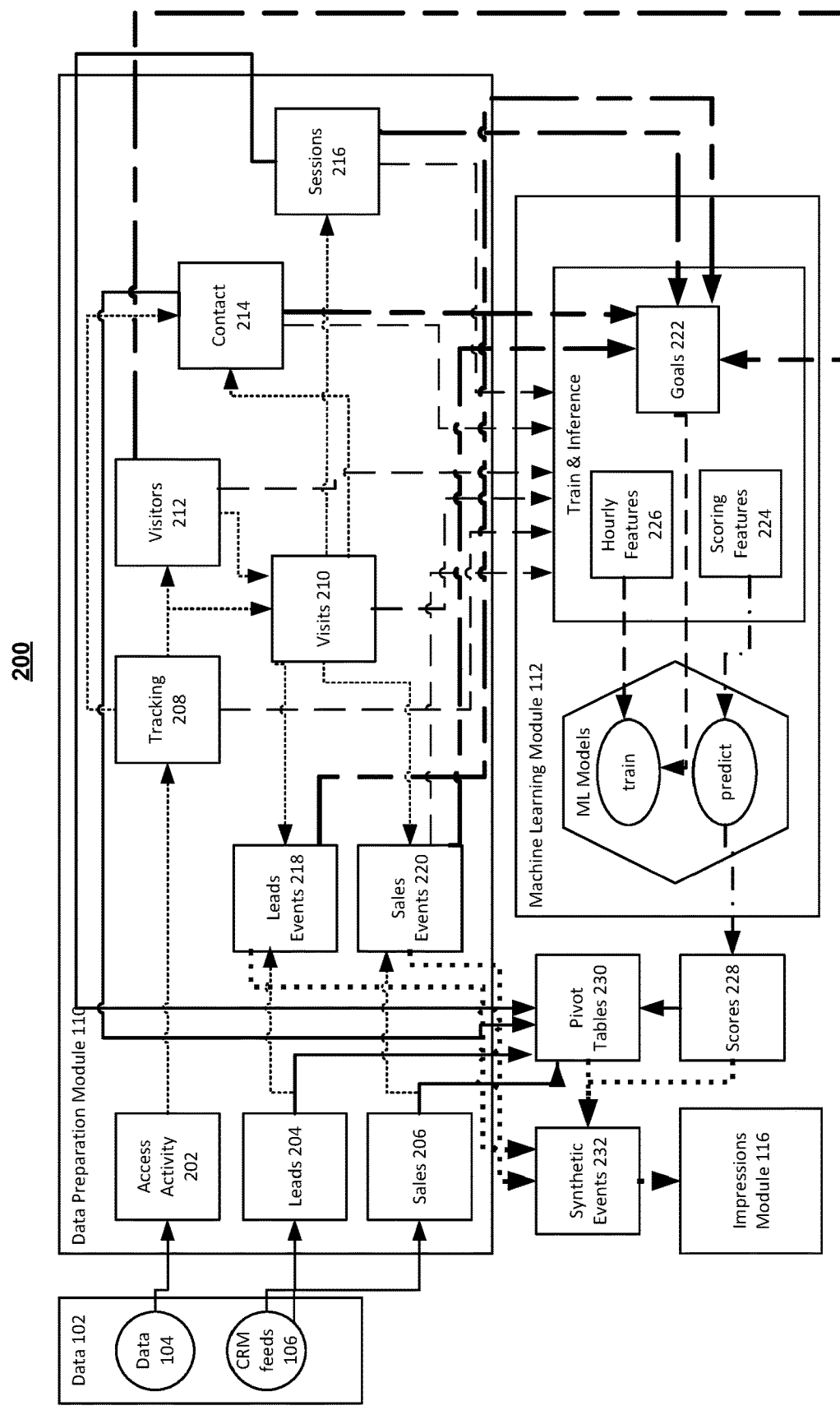
FIG. 2 is a block diagram illustrating an expanded view of modules in the predictive analytics component.

FIG. 2 is block diagram 200 illustrating an expanded view of modules in the predictive analytics component 108. In diagram 200, data 102 is provided to data preparation module 110, which extracts behavior activity 202 from data 104. User activity 202 involves tracking 208 (e.g., the selection of necessary data describing "behavior" (e.g., user ID, where on the website did the user make clicks, how long did the user stay on the website)). User activity 202 further includes visits 210, which represent identifiers for separate visits by the same user. User activity 202 further includes visitors 212, which represent identifiers of unique users. In this case, data preparation module 110 parses user activity 202 to assign the same user ID to a user that uses different devices to access the website. If a person left a form or is signed on different devices/browsers (uses same IDs such as email, phone number, etc.), the visits are considered together (e.g., as one input vector). User activity 202 further includes contact 214, which includes information about individual users such as email addresses, phone numbers, addresses, IP addresses, device IDs, etc. User activity 202 further includes sessions 216, which is a short version of the table with visits.

Data preparation module 110 also infers leads 204 and sales 206 (i.e., conversions) from CRM feed 106. Here, a lead is defined by customers (e.g., "talked to sales team") for which there is an introduction of the asset already. Data preparation module 110 generates leads events 218 and sales events 220 from leads 204 and sales 206. An event places a sale or a lead in a point of time. For example, sales information may indicate that a person bought an asset, whereas a sales event indicates when the sales occurred. The determination of tracking 208, visitors 212, visits 210, contact 214, sessions 216, leads events 218, and sales events 220 are part of a preparation process.

Data preparation module 110 is configured to align conversion data with online behavior data. Because several conversions occur offline, in an exemplary aspect, online and offline events are matched using a set of unique IDs. These unique IDs include online IDs such as a Lead ID pushed to a CRM system or a Google Client ID, as well as emails/phone numbers from website HTML forms. This alignment process is part of a feature definition shown in FIG. 2, as the information is provided to machine learning module 112. For example, suppose that a user accesses a website using his/her smartphone or computer. A Google Analytics tracker may place an anonymous Google Client ID first party cookie which will be readable during future visits of this user within 14-30 days from the last visit depending on the type of browser. During the visit, the user may start to enter contact information, so the website code can generate a unique Lead ID and store it as an anonymous first party cookie again for up to 14-30 days. Then the user may enter an email and/or a phone number in a contact page/form. Predictive analytics component 108 collects the Google Client ID, Lead ID, encrypted and/or hashed email and/or phone number, and monitors for a tracking hit using a cloud server. At the same time, when user hits a submit button on the website, predictive analytics component 108 collects the Google Client ID, Lead ID, email and/or phone, and sends them to the client associated with the website, who may store the information in their CRM (so that the whole future sales process and final transaction is linked to the IDs).

At the stage of uploading CRM data, the client uploads transactions linked to the collected the Google Client ID, Lead ID, email and/or phone number. As a result, the online behavior on the website can be matched by predictive analytics component 108 with the future transactions in the CRM of the client.

Machine learning module 112 trains at least one machine learning algorithm by defining features in online behavior data that will be used to meet certain goals 222 (e.g., target sales events, target leads events, etc.). The number of features 224 may depend on the website (e.g., how many pages/buttons, etc.). For example, table 1 defined a training vector for a website with a main page with three clickable buttons—each leading to a supplemental webpage. If there were more buttons/pages, the training vector would be larger. In some aspects, the features may be divided on an hourly basis (e.g., hourly features 226), where the features hold a different weight depending on the time of day a user session was held.

Subsequent to alignment, machine learning module 112 may train at least one machine learning module to generate prediction scores 228 for events. In some aspects, predictive analytics component 108 may generate pivot tables 230 that include the scoring information for a client (e.g., a long-term conversion entity). In some aspects, predictive analytics component 108 builds synthetic events 232 based on scores 228. For example, if decisions module 114 determines that a prediction score (e.g., 0.9) for a sales event is greater than a threshold prediction score (e.g., 0.85), predictive analytics component 108 may generate a synthetic sales event that includes information about what assets will be requested for purchase and in what quantity. Synthetic events 232 are provided to impressions module 116 (which may be part of an ad platform).

As mentioned previously, the predictive analytics may be used by impressions module 116 to train an advertising-directing machine learning algorithm and activate platform data not just by uploading custom segments, but by creating synthetic conversion events with a predicted value. This is useful for long-term conversion entities (no matter how long their sales and LTV cycles are) because their data can be treated as e-commerce from the perspective of advertising platforms. The predictive analytics may also help marketers increase the efficiency of ad campaigns in a variety of ways.

Conventional data-driven and funnel-based attribution has the following features: a known number of sales, data directly related to the sale, appropriately weighted actions that influenced a known result, results that are available after a long delay, and results that are sensitive to data completeness. The predictive attribution of the present disclosure has the following features: data about a user session, machine learning that provides incremental revenue forecasts upon session termination, real-time results, and resistance of the results from the completeness of input data.

Figure 3:
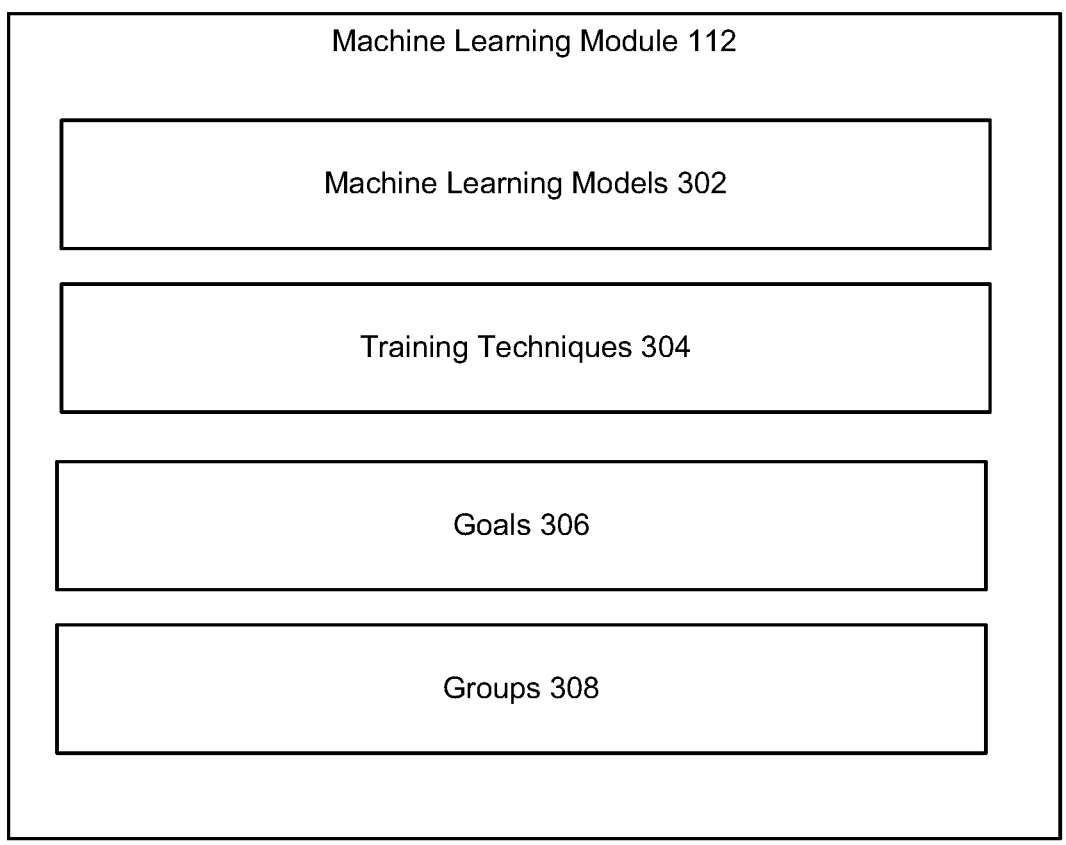
FIG. 3 is a block diagram illustrating the machine learning models trained by the machine learning module.

FIG. 3 is block diagram 300 illustrating the machine learning models trained by machine learning module 112. In some aspects, to analyze behavior on the site, the client of predictive analytics component 108 may set up events on the website. For example, events may include being on the website for more than a minute or clicking buttons on the website. Online tracking module 109 collects information about these events.

In some aspects, machine learning module 112 may use gradient boosted decision trees (e.g., BigQuery wrapper to xgboost) as a core machine learning algorithm. In some aspects, machine learning module 112 may use additional dimensionality reduction techniques such as principal component analysis (PCA).

In some aspects, the machine learning algorithm comprises a plurality of machine learning models 302 trained by machine learning module 112. For example, machine learning module may build 24 (hours)*3 (cross-validation)*3 (on which groups we train models)*5 (number of goals) models. Since there is hourly seasonality (website traffic and intentions of a user may change based on the hour of day they access the website), 24 machine models (one for each hour) are built. A prediction score is calculated for each and an average prediction score is determined (i.e., average the results of predictions across models calculated for different hours in the day).

Machine learning module 112 may also use training techniques 304 such as cross-validation by dividing the training vectors into 3 equal parts depending on the ID of visit (use the remainder of division by three). Machine learning module 112 then trains models on the first and second parts and checks predictive power on the third part (check the forecast variance). In some aspects, machine learning module 112 may repeat this approach multiple times (e.g., two more times) by dividing into parts differently. As a result, there may be three models and for an input online behavior vector, machine learning module 112 selects one model corresponding to the identifier remainder of division by tree. This process increases the overall predictive power by preventing overfitting because predictions are always done by a model that did not see the data during the training period.

As mentioned previously, goals 306 are target events. A target event may be a website revisit, a provision of contact details, a lead event (e.g., user becomes a lead), a sale event (e.g., user requests the asset), and a conversion size (e.g., value of request/LTV), and wherein the machine learning models are configured to generate prediction scores for each target event.

In terms of incremental conversions, in the standard approach, for every user based on his behavior on the website, the machine learning models predict lifetime value—pLTV_day (LTV in the time/day of the visit). If the user visits the website twice, incremental LTV is the difference between the accumulated value between the last visit and one session before.

Here, there are two probabilities: pLTV_day1 and pLTV_day2. The added value of the second visit (incremental LTV) equals pLTV_day2-pLTV_day1. This approach does not take into account that while the person does not come back, his pLTV decreases and the real incremental conversion is larger. The decrease depends on the lag between visits. If it is large (for example, 1 year, pLTV_day1 should be discounted almost to zero. This means that the last session "warmed up" the customer more than if the previous estimate is subtracted.

In the present disclosure, incremental LTV is calculated from the added predicted LTV of the last 24 hours (pLTV_day2-24 hours). Accordingly, users of the website are divided into three groups 308: "newcomers"—people, who visited the website during the last 24 hours and it was their first visit, "came again"—people, who visited the website during the last 24 hours, but it was not their first visit (they visited the website during last 28 days), and "oldies"—people, who did not visit the website during the last 24 hours, but visited it during last 28 days. It should be noted that the 24 hours and 28 days represent a first period of time and a second period of time, which may change based on the configurations set by the operator of predictive analytics component 108.

For newcomers, there is no such concept as "incremental predictive conversion," as there are no previous visits. As a result, machine learning module 112 does not extract any predictive conversions/pLTV. Instead, machine learning module 112 calculates pLTV_day2 using Model_1. Model_1 is trained only on "newcomers."

If the person visits the website not for the first time, machine learning module 112 uses Model_2 to calculate pLTV_day2. Model_2 is trained on data for the "came again" group and includes all 28 days (with the last 24 hours). Machine learning module 112 calculates pLTV_day2-24 hours by using Model_3, which is trained on "came again" and "oldies" data and excludes the last 24 hours. This implementation shows what a user of the website was doing 24 hours before a given time and how such users are then converted throughout the sample. It should be noted that Model 3 is trained on both "came again" and "oldies" group data. If it was trained only on "came again," it would predict very high probability of conversion. If it was trained only on "oldies," the probability of conversion would be too low. A summary of the models is presented in table 2 below:

TABLE 2

Models for groups of persons

|  | Visited the website during the last 24 hours | Visited the website during last 28 days | Send incremental LTV to Ad Platforms | Models to calculate pLTV_day2 of the current visit | Models for the baseline - pLTV_day2-24hours (24 hours ago from the current visit) |
|---|---|---|---|---|---|
| Newcomers | Yes | No | Yes | Model_1. is trained on "Newcomers" | Just 0 |
| Came again | Yes | Yes | Yes | Model_2. trained on "Came again" | Model 3. Trained on the "Came again" and "Oldies" |
| Oldies | No | Yes | No | — | Model 3. Trained on the "Came again" and "Oldies" |

In some aspects, the quality of models is monitored with AUC-ROC metrics for the quality of predictions. Models are retrained according to a schedule (e.g., weekly, monthly, etc.) or on a need basis when the quality of predictions drops below a certain accuracy. For example, predictive analytics component 108 may generate a synthetic event of a conversion. If after a period of time the conversion does not actually happen, the synthetic event is incorrect. The overall accuracy of the models is determined (e.g., 88%). In response to determining that the accuracy is less than a threshold accuracy (e.g., 90%), machine learning module 112 may retrain the models.

Figure 4:
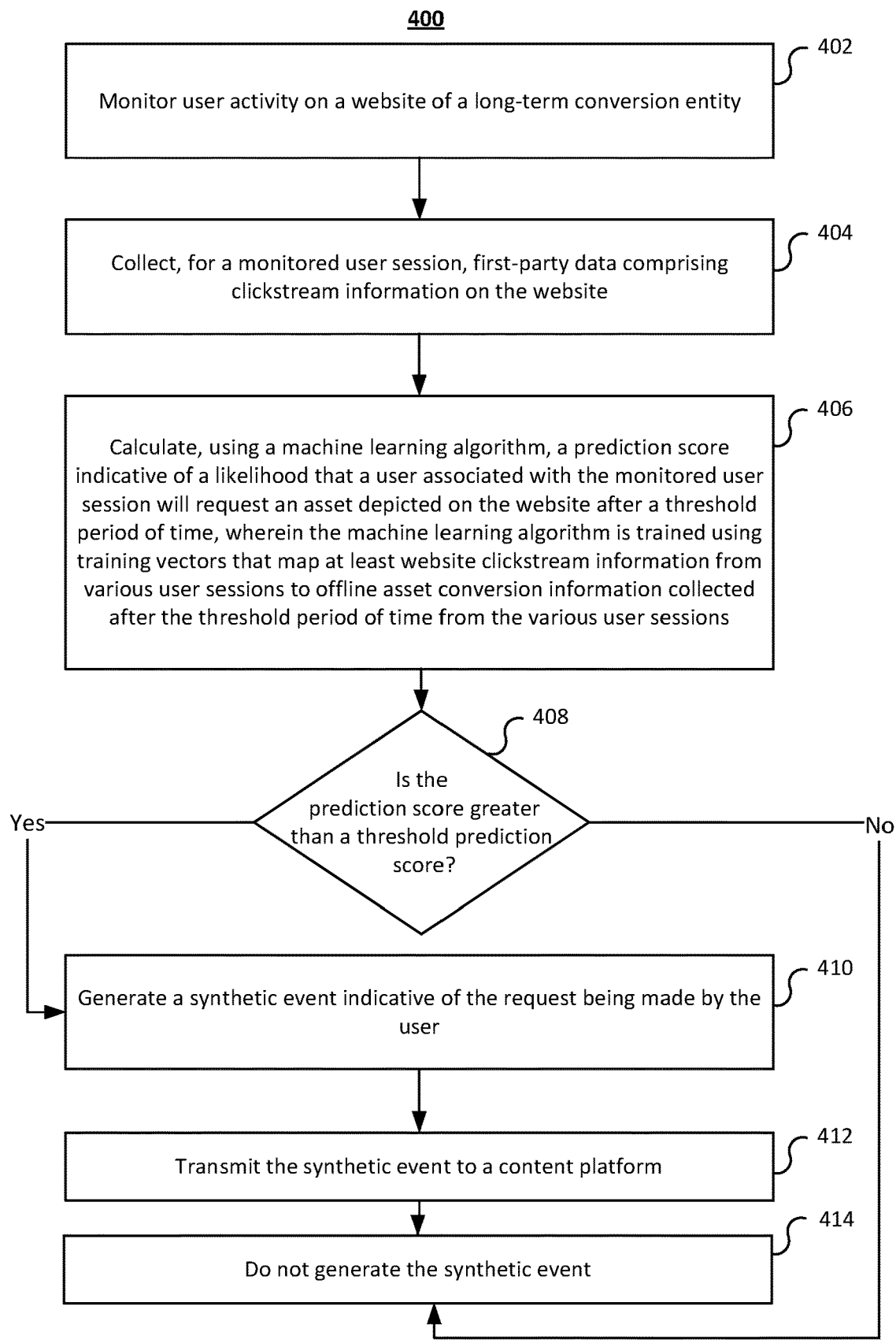
FIG. 4 illustrates a flow diagram of a method for generating synthetic events.

FIG. 4 illustrates a flow diagram of method 400 for generating synthetic events. At 402, predictive analytics component 108 monitors user activity on a website of a long-term conversion entity. At 404, predictive analytics component 108 collects, for a monitored user session, first-party data comprising clickstream information on the website.

At 406, predictive analytics component 108 calculates, using a machine learning algorithm, a prediction score indicative of a likelihood that a user associated with the monitored user session will request an asset depicted on the website after a threshold period of time, wherein the machine learning algorithm is trained using training vectors that map at least website clickstream information from various user sessions to offline asset conversion information collected after the threshold period of time from the various user sessions.

At 408, predictive analytics component 108 determines whether the prediction score is greater than a threshold prediction score. In response to determining that the prediction score is greater than the threshold prediction score, method 400 advances to 410, where predictive analytics component 108 generates a synthetic event indicative of the request being made by the user (e.g., the synthetic event indicates that the asset was requested for purchase and a transaction was completed of a certain conversion size). At 412, predictive analytics component 108 transmits the synthetic event to a content platform (e.g., an ad platform).

In response to determining that the prediction score is not greater than the threshold prediction score, method 400 advances to 414, where predictive analytics component 108 does not generate the synthetic event. In some aspects, this further involves creating an indication that the website usage does not indicate that the user will request the asset.

In some aspects, the synthetic event may indicate that the user is a lead. For example, predictive analytics component 108 may determine that the user provided contact information on the website (e.g., an email address or a phone number). In response, predictive analytics component 108 may update a CRM of a client platform with the contact information and indicate that the user is a lead. This enables differentiated sales, marketing tactics, and processes to be applied for leads (e.g., a fully automated flow for low-value leads versus high-touch and personal follow-ups for high-value leads).

In some aspects, for leads, prediction scores may be sent to back-to-back clients of predictive analytics component 108 using a set of different methods to optimize the sales process. In some aspects, lead scores may be uploaded directly to the CRM of the client as a comma-separated values (csv) file, or may be pulled from a cloud service such as the Google Cloud BigQuery where predictive analytics component 108 stores prediction scores.

Over time several different users may visit the website. As a result, predictive analytics component 108 may calculate a plurality of prediction scores for users accessing the website. In some aspects, predictive analytics component 108 may rank the plurality of prediction scores and transmit the ranked plurality of prediction scores to the content platform. This enables users associated with higher scores to be treated differently than users associated with lower scores. In some aspects, predictive analytics component 108 may segment the plurality of prediction scores into different groups, and transmit, to the content platform, the segmented plurality of prediction scores based on the different groups. Segmentation enables multiple members of the same group to be treated in the same manner (e.g., shown the same advertisements and given the same bids), which ultimately enhances performance because actions do not have to be taken by the content platform on an individual level (this may be unsuitable when the visitors on the website range from the thousands to the millions).

In some aspects, predictive analytics component 108 may perform attribution (i.e., storing and transmitting information on predictive value of web sessions and users so it can be analyzed at different levels (ad/creative, campaign, channel) to determine what marketing channels and tactics are working (producing the required ROI and incremental demand) without having to wait for offline conversions to happen (often with few weeks or few months delay), and without being limited by rare conversions data and low statistical significance of the findings). Because predictive analytics component 108 scores 100% of incoming website traffic while a typical conversion rate of a long-term conversion entity is below 1%, 100× more data is provided and thus the findings are more statistically significant.

Figure 5:
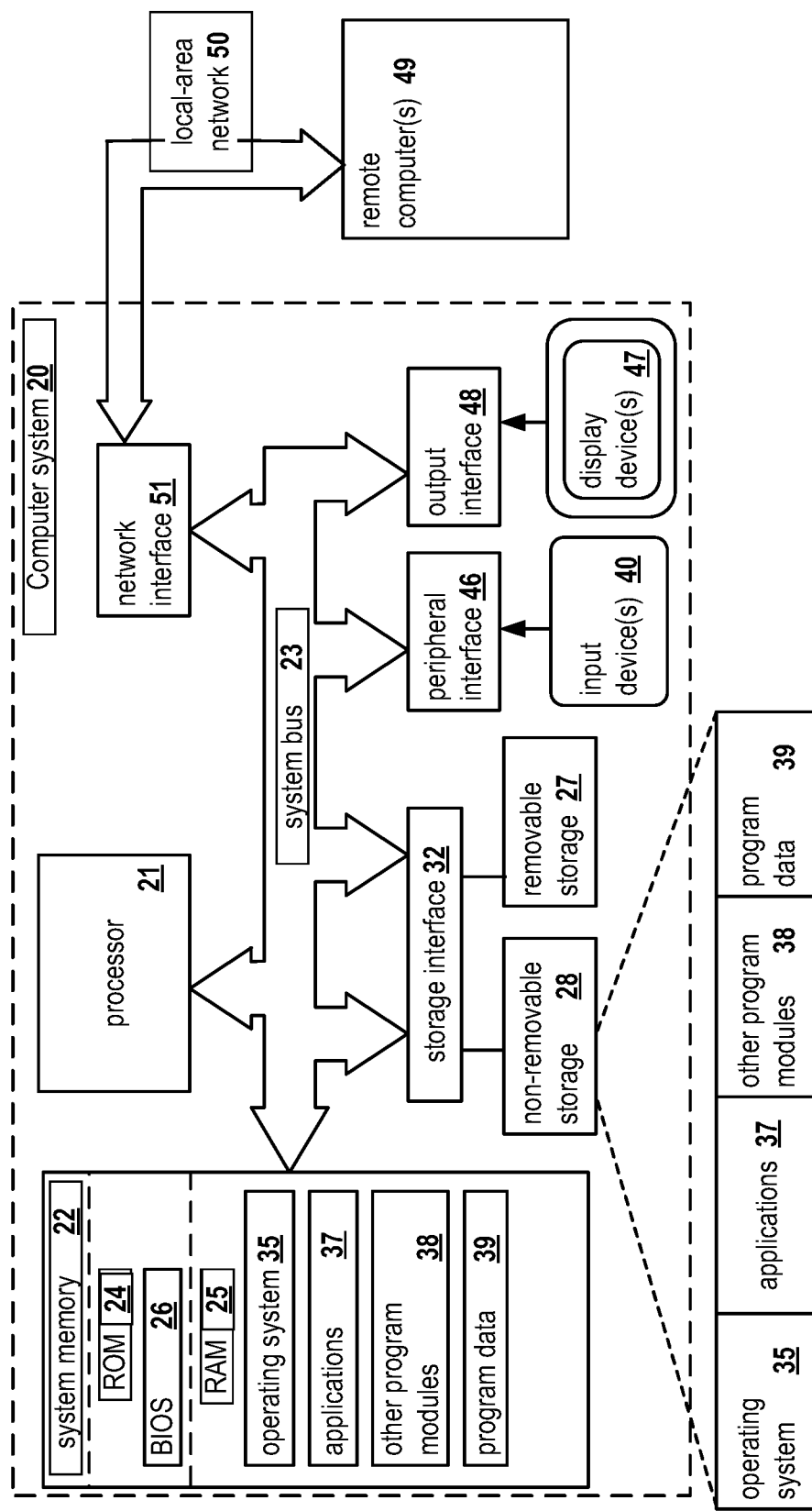
FIG. 5 presents an example of a general-purpose computer system on which aspects of the present disclosure can be implemented.

FIG. 5 is a block diagram illustrating a computer system 20 on which aspects of systems and methods for implementing predictive analytics using first-party data of long-term conversion entities may be implemented in accordance with an exemplary aspect. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable code implementing the techniques of the present disclosure. For example, any of commands/steps discussed in FIGS. 1-4 may be performed by processor 21. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system. Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for selecting media content based on generated synthetic events, the method comprising:
   monitoring, by a hardware processor, user activity on a website of a long-term conversion entity that receives asset requests after at least a period of time has elapsed since initial user activity on the website;
   collecting, by the hardware processor, for a monitored user session, first-party data comprising clickstream information on the website;
   calculating, by the hardware processor, using a machine learning algorithm, a prediction score indicative of an increase in likelihood that a user associated with the monitored user session will request an asset depicted on the website after a threshold period of time, wherein the machine learning algorithm is trained using training vectors that map at least website clickstream information from various user sessions to offline asset conversion information collected after the threshold period of time from the various user sessions;
   wherein the machine learning algorithm comprises a plurality of machine learning models calculating a plurality of prediction scores for each of a group of persons accessing the website, wherein the group of persons includes users that visit the website for a first time within a specified period of time, users that visit the website again within the specified period of time, and users that have not visited the website within the specified period of time, but visited the website before the specified period of time;
   in response to determining that the prediction score is greater than a threshold prediction score, generating, by the hardware processor, prior to the threshold period of time elapsing, a synthetic event indicative of the request being made by the user; and
   transmitting, by the hardware processor, the synthetic event to a content platform that (i) selects media content from a plurality of media content to present to the user associated with the synthetic event, and different media content from the plurality of media content to present to a different user, for whom no synthetic event was generated, wherein the plurality of media content comprises information about the asset; and (ii) transmits the media content to a first device associated with the user and the different media content to a second device associated with the different user based on the prediction score, wherein the different media content presented to the different user features more information about the asset than the media content presented to the user.

2. The method of claim 1, wherein the threshold period of time is one of: a week, a month, a year.

3. The method of claim 1, further comprising:
   calculating a plurality of prediction scores for users accessing the website;
   segmenting the plurality of prediction scores into different groups; and
   transmitting, to the content platform, the segmented plurality of prediction scores based on the different groups.

4. The method of claim 1, further comprising:
   calculating a plurality of prediction scores for users accessing the website;
   ranking the plurality of prediction scores; and
   transmitting the ranked plurality of prediction scores to the content platform in a form of conversion events.

5. The method of claim 1, further comprising:
   receiving contact information from the user;
   identifying the user as a lead in a client platform; and
   calculating the prediction score for the lead to convert into a subsequent request.

6. The method of claim 1, wherein the offline asset conversion information comprises a data-feed from customer relationship management (CRM) or end-to-end analytics system, and wherein the website clickstream information is aligned with the offline asset conversion information using unique identifiers including client identifiers, lead identifiers, email addresses, phone numbers, and first-party cookie identifiers.

7. The method of claim 1, wherein the synthetic event further indicates a conversion size of the request for the asset.

8. The method of claim 1, wherein the first-party data collected for the monitored user session and the training vectors further comprise at least one of: a page view count for at least one page of the website, a time spent per page of the website, a scroll depth indicative of an amount of a page viewed, geolocation, device and browser types, specific values associated with the asset on the website, online events related with progressions of an online purchase path.

9. The method of claim 1, wherein the website clickstream information comprise s clicks on at least one HTML, element on at least one page of the website.

10. The method of claim 1, further comprising:
    in response to determining that the prediction score is greater than the threshold prediction score, updating an asset conversion forecast comprising anticipated revenue information.

11. The method of claim 1, wherein the machine learning algorithm comprises a plurality of machine learning models for at least one of: each hour in a day, and target events indicated in the offline asset conversion information.

12. The method of claim 11, wherein the target events comprise at least one of: a website revisit, a provision of contact details, a lead event, a sale event, and a conversion size, and wherein the machine learning models are configured to generate prediction scores for each target event.

13. The method of claim 12, wherein the prediction score is an incremental prediction score, and wherein a final prediction score for each of the target events is calculated as a difference of respective prediction scores before and after a latest user session on the website by the user.

14. A system for selecting media content based on generated synthetic events, the system comprising:
a hardware processor configured to:
monitor user activity on a website of a long-term conversion entity that receives asset requests after at least a period of time has elapsed since initial user activity on the website;
collect, for a monitored user session, first-party data comprising clickstream information on the website;
calculate, using a machine learning algorithm, a prediction score indicative of an increase in likelihood that a user associated with the monitored user session will request an asset depicted on the website after a threshold period of time, wherein the machine learning algorithm is trained using training vectors that map at least website clickstream information from various user sessions to offline asset conversion information collected after the threshold period of time from the various user sessions;
wherein the machine learning algorithm comprises a plurality of machine learning models calculating a plurality of prediction scores for each of a group of persons accessing the website, wherein the group of persons includes users that visit the website for a first time within a specified period of time, users that visit the website again within the specified period of time, and users that have not visited the website within the specified period of time, but visited the website before the specified period of time;
in response to determining that the prediction score is greater than a threshold prediction score, generate, prior to the threshold period of time elapsing, a synthetic event indicative of the request being made by the user; and
transmit the synthetic event to a content platform that (i) selects media content from a plurality of media content to present to the user associated with the synthetic event, and different media content from the plurality of media content to present to a different user, for whom no synthetic event was generated, wherein the plurality of media content comprises information about the asset; and (ii) transmits the media content to a first device associated with the user and the different media content to a second device associated with the different user based on the prediction score, wherein the different media content presented to the different user features more information about the asset than the media content presented to the user.

15. The system of claim 14, wherein the threshold period of time is one of: a week, a month, a year.

16. The system of claim 14, wherein the hardware processor is further configured to:
calculate a plurality of prediction scores for users accessing the website;
segment the plurality of prediction scores into different groups; and
transmit, to the content platform, the segmented plurality of prediction scores based on the different groups.

17. The system of claim 14, wherein the hardware processor is further configured to:
receive contact information from the user;
identify the user as a lead in a client platform; and
calculate the prediction score for the lead to convert into a subsequent request.

18. The system of claim 14, wherein the offline asset conversion information comprises a data-feed from customer relationship management (CRM) or end-to-end analytics system, and wherein the website clickstream information is aligned with the offline asset conversion information using unique identifiers including client identifiers, lead identifiers, email addresses, phone numbers, and first-party cookie identifiers.

19. The system of claim 14, wherein the synthetic event further indicates a conversion size of the request for the asset.

20. A non-transitory computer readable medium storing thereon computer executable instructions for selecting media content based on generated synthetic events, including instructions for:
monitoring user activity on a website of a long-term conversion entity that receives asset requests after at least a period of time has elapsed since initial user activity on the website;
collecting, for a monitored user session, first-party data comprising clickstream information on the website;
calculating, using a machine learning algorithm, a prediction score indicative of an increase in likelihood that a user associated with the monitored user session will request an asset depicted on the website after a threshold period of time, wherein the machine learning algorithm is trained using training vectors that map at least website clickstream information from various user sessions to offline asset conversion information collected after the threshold period of time from the various user sessions;
wherein the machine learning algorithm comprises a plurality of machine learning models calculating a plurality of prediction scores for each of a group of persons accessing the website, wherein the group of persons includes users that visit the website for a first time within a specified period of time, users that visit the website again within the specified period of time, and users that have not visited the website within the specified period of time, but visited the website before the specified period of time;
in response to determining that the prediction score is greater than a threshold prediction score, generating, prior to the threshold period of time elapsing, a synthetic event indicative of the request being made by the user; and
transmitting the synthetic event to a content platform that (i) selects media content from a plurality of media content to present to the user associated with the synthetic event, and different media content from the plurality of media content to present to a different user, for whom no synthetic event was generated, wherein the plurality of media content comprises information about the asset; and (ii) transmits the media content to a first device associated with the user and the different media content to a second device associated with the different user based on the prediction score, wherein the different media content presented to the different user features more information about the asset than the media content presented to the user.

* * * * *